(12) United States Patent
Derks

(10) Patent No.: US 10,057,507 B2
(45) Date of Patent: Aug. 21, 2018

(54) SHIFTED BINNING IN X-RAY SENSORS

(71) Applicant: TELEDYNE DALSA B.V., AE Eindhoven (NL)

(72) Inventor: Henk Derks, Waalre (NL)

(73) Assignee: TELEDYNE DALSA B.V., Eindhoven (NL)

( * ) Notice: Subject to any disclaimer, the term of this patent is extended or adjusted under 35 U.S.C. 154(b) by 0 days.

(21) Appl. No.: 15/568,233

(22) PCT Filed: Apr. 22, 2015

(86) PCT No.: PCT/NL2015/050269
§ 371 (c)(1),
(2) Date: Oct. 20, 2017

(87) PCT Pub. No.: WO2016/171544
PCT Pub. Date: Oct. 27, 2016

(65) Prior Publication Data
US 2018/0146143 A1 May 24, 2018

(51) Int. Cl.
| | |
|---|---|
| *G01J 1/42* | (2006.01) |
| *H04N 5/32* | (2006.01) |
| *H04N 5/378* | (2011.01) |
| *G01T 1/16* | (2006.01) |
| *H04N 5/376* | (2011.01) |
| *H04N 5/347* | (2011.01) |
| *H04N 1/04* | (2006.01) |

(52) U.S. Cl.
CPC ............... *H04N 5/32* (2013.01); *G01T 1/16* (2013.01); *H04N 5/347* (2013.01); *H04N 5/378* (2013.01); *H04N 5/3765* (2013.01); *H04N 1/04* (2013.01)

(58) Field of Classification Search
CPC ............. H04N 5/347; H04N 1/04; H04N 5/32
USPC ........................................................ 250/394
See application file for complete search history.

(56) References Cited

U.S. PATENT DOCUMENTS

| | | | |
|---|---|---|---|
| 6,035,013 A | 3/2000 | Orava et al. | |
| 2004/0012689 A1 | 1/2004 | Tinnerino et al. | |
| 2006/0192087 A1* | 8/2006 | Kuszpet ............... | G01T 1/2928 250/214 R |

(Continued)

FOREIGN PATENT DOCUMENTS

EP 2667589 A1 11/2013

OTHER PUBLICATIONS

International Search Report for International Application No. PCT/NL2015/050269, dated Aug. 11, 2015.

(Continued)

*Primary Examiner* — Kenneth J Malkowski
(74) *Attorney, Agent, or Firm* — K&L Gates LLP

(57) ABSTRACT

The present invention is related to an image sensor and to a method for operating such sensor. The sensor of the invention comprises a pair of butted sensor tiles, each sensor tile comprising a pixel array comprising a plurality of rows and columns of photosensitive pixels.

By constructing first row groups using at least one imaginary row, a different center-to-center distance exists between the different row groups than that which is obtained in prior art devices. More in particular, the construction according to the present invention allows the center positions of the rows to lie on a regular grid thereby lowering the geometrical distortion of the resulting image.

10 Claims, 9 Drawing Sheets

(56) References Cited

U.S. PATENT DOCUMENTS

2012/0140881 A1* 6/2012 Yoshimatsu ............ G01T 1/247
378/62
2013/0284892 A1* 10/2013 Kyushima ......... H01L 27/14658
250/208.1

OTHER PUBLICATIONS

Written Opinion of the International Searching Authority for International Application No. PCT/NL2015/050269, dated Aug. 11, 2015.

* cited by examiner

SHIFTED BINNING IN X-RAY SENSORS

The present invention is related to an image sensor and to a method for operating such sensor. More in particular, the present invention is related to sensors for detecting X-rays to thereby generate an image of an object. These sensors are known in the art.

Typically, X-ray sensors comprise a scintillator to convert the incoming X-rays into visible light. Subsequently, the visible light is detected using photosensitive components, such as photodiodes.

FIG. 1 illustrates a known pixel that is used in known X-ray sensors. It comprises a photodiode D1 that is configured to convert incoming visible light into an electric current. The pixel further comprises three transistor FET 1-FET 3 and two storage capacitors C1, C2, wherein C2>>C1.

The operational principles of the pixel in FIG. 1 will be described next, starting with the situation in which FET 1 is in its non-conductive state. As a first step, node N will be reset to a predefined voltage by switching FET 2 such that node N is connected to a reference voltage $V_{ref}$. Thereafter, FET 2 will be put in its non-conductive state and the photocurrent generated by diode D1 will slowly discharge capacitor C1, thereby lowering the voltage at node N. The momentary voltage at node N can be sensed using source follower FET 3, provided this voltage does not become too low.

The voltage at node N is indicative for the amount of generated photocurrent in a given time frame and thereby for the amount of incoming X-rays. The output node, being the source of FET 3, is typically connected to read-out circuitry that is known in the art.

By using a second capacitor C2, which can be put parallel to C1 by bringing FET 1 in its conductive state, a different total capacitance can be realized. This configuration is referred to as a dual full-well configuration and allows the sensor performance, such as the signal-to-noise ratio, to be optimized in view of the expected X-ray intensity.

Typically, a sensor comprises a plurality of pixels. These pixels can for instance be realized on a Si wafer in a CMOS process. In addition to the pixels, read-out circuitry is arranged on the wafer. The combination of the pixels and the read-out circuitry is commonly referred to as a sensor tile.

In the art, pixels are arranged in a pattern of rows and columns. Such pattern is illustrated in FIG. 2. Here, each pixel is connected to a column line 5, 6 by means of a select FET (not illustrated). This select FET is connected in between source follower FET 3 and a respective column line 5, 6. By providing the appropriate control signal to this select FET, hereinafter referred to as the select signal, the voltage of node N of a pixel can be read via column line 5, 6. In FIG. 2, each of the four pixels illustrated is connected to a select line 1, 2. In addition, each pixel is connected to a reset line 3, 4 for controlling reset FET 2 of each pixel.

Typically, each column line 5, 6 is connected to separate read-out circuitry to allow the voltage at node N to be simultaneously sensed for all pixels on a given row. An analog-to-digital converter (ADC) may be used to output a digital value representing the voltage at node N for a given pixel.

As can be seen from FIG. 2, a plurality of pixels is connected to a single column line 5, 6. To allow each pixel in a given row to be individually selected, appropriate select signals must be provided using the select lines 1, 2. Normally, only a single select line is made active at a given time. A select driver 8 may be used to set the voltage level of the select line at a given level as illustrated in FIG. 3. Select driver 8 further provides a buffering function for the capacitive load of the interconnect and the select FETs, which are arranged in parallel. It allows an appropriate timing of the control signal that is sent to the select transistor within each pixel.

Each select driver 8 is in turn connected to an output of a shift register that comprises a plurality of flip-flops 7. In FIG. 3, a voltage pulse is applied at one of the inputs of the first flip-flip from the bottom and a high level of the clock signal is applied to the other input, thereby causing the flip-flip to output a logical high level to the connected select driver. This driver in turn receives a select timing pulse. Whenever this signal has a high logical level or other appropriate level, the select driver will apply a voltage to the select line it is connected to for selecting the pixels that are connected to that select line. During a clock period, the voltage of node N of these pixels can be read-out. At the next clock pulse, the output of the first flip-flop will return to a logical low level and the second flip-flop from the bottom will output a logical high level to the select driver it is connected to. In this way, each row is sequentially and individually selected. Here, it is noted that the pulse duration of the control signal that is sent by a flip-flop to a select driver 8 is larger than the pulse duration of the control signal sent by this select driver to a select transistor. This mode of operation, hereinafter referred to as full-resolution read out, provides an X-ray image having the highest possible resolution corresponding to the resolution of the pixel array. However, due to the sequential and individual nature of addressing the rows, such image can only be obtained at the expense of a relatively low frame rate. For some applications, a high frame rate is desired, for instance if the object under study is moving. In addition, it may be desirable to combine input from several pixels to increase the signal-to-noise ratio at the expense of the resolution.

An approach followed in the prior art comprises the so-called binning of rows of pixels, as illustrated in FIG. 4. In this approach, a select driver selects two or more rows simultaneously. Compared to FIG. 2, each select line 1' and reset line 3' controls two rows of pixels, an even row j and an odd row j+1, wherein j=2×n with n and integer.

The outputs of pixels that are vertically adjacent to each other in FIG. 4, are, contrary to FIG. 2, not connected to the same column line. Instead, pixels in odd rows are connected to column line 5", whereas pixels in even rows are connected to column line 5'. The signals collected at column lines 5' and 5" and at column lines 6' and 6" can be combined. For instance, these signals may be averaged. For an original full resolution of 400 rows by 400 columns, this would yield an image having a resolution of 200×400, wherein each pixel represents the average of two pixels belonging to the same column, albeit to a different row.

It is noted that the configuration of FIG. 4 cannot be used to perform full-resolution reading of the pixels due to fixed connection at the select line 1' and reset line 3'. Alternatively, a switchable configuration may be used allowing a dual-mode operation, a first full resolution mode wherein each row is individually and sequentially addressed, and a second binning mode, wherein pairs of rows are individually and sequentially addressed.

In particular for X-ray imaging, a large sensor surface is desired. As the Si wafer size is limited, it is only possible to increase the sensor size beyond that of the maximum tile size by combining several tiles in one sensor. This is referred to as butting tiles. FIG. 5A illustrates an example wherein two tiles (Tile 0 and Tile 1) are vertically butted against each other. Each tile comprises a region 10 in which inter alia the read-out circuitry is arranged. Furthermore, each tile comprises a space 11 in the pixel array 12 in which the shift registers, the select drivers and reset drivers are arranged.

Despite the fact that the tiles are adjacently arranged as close as possible, a so called butting gap exists between the top most pixels in Tile 0 and the bottom most pixels in Tile 1. This is further illustrated in FIG. 5B, wherein a pixel 15 belonging to Tile 1 is adjacent to a pixel 16 belonging to Tile 0. A butting gap 14 exists between these pixels. Typically, this butting gap should be roughly equal to a multiple of the pixel-to-pixel distance in a tile to allow all the pixels to be arranged on a regular grid.

No image information can be obtained inside the butting gap. Consequently, the image obtained comprises a distortion in the vertical direction. In the prior art, this problem is solved by manipulating the image signals from Tile 0 and Tile 1, for instance by adding one or more lines in the image between the image parts that correspond to Tile 0 and Tile 1. These lines correspond to one or more rows of imaginary pixels that would normally reside in the butting gap. The values of these added pixels can represent an average of for instance pixels 15 and 16. Alternatively, the pixel value can be given a predetermined value, for instance corresponding to the color black.

Even when tiles are butted, binning can be used to increase the frame rate and/or to improve the signal-to-noise ratio. However, the applicant has found that for most prior art devices a geometrical distortion in the resulting image occurs when binning is applied to butted tiles.

It is therefore an object of the present invention to provide an image sensor that comprises butted sensor tiles, which sensor allows binning with improved geometrical accuracy of the resulting image.

According to the invention, this object is achieved with an image sensor that comprises a pair of butted sensor tiles, wherein each sensor tile comprises a pixel array comprising a plurality of rows and columns of photosensitive pixels, a respective row driver for driving the respective rows in dependence of a respective timing signal, and a read-out unit for reading out selected pixels among the plurality of pixels.

The image sensor further comprises a timing controller for generating the timing signals, and at least one imaginary row of photosensitive pixels added below the lowest row of pixels or above the highest row of pixels in at least one of the sensor tiles. The rows and the at least one imaginary row on each tile are grouped in first row groups comprising adjacently arranged rows including the at least one imaginary row, wherein a center-to-center distance between adjacent first row groups is equal to a first distance on both sensor tiles, and wherein a center-to-center distance between first row groups that are on different tiles is substantially equal to one or a multiple of the first distance. For instance, if the first row of a tile extends along the column direction from 0 to 100 micrometer, and two imaginary rows are added below this row, a first row group could be constructed of which the center would be at −150 micrometer. The imaginary rows are not physically present but are account for in the construction of first row groups and the computation of center-to-center distances.

According to the invention, the image sensor is separately operable in each of the following modes: a full-resolution mode wherein each row of pixels is individually and sequentially selectable and wherein the read-out unit is configured to read-out the pixels in the selected row, and a shifted binning mode, wherein each row in a first row group is simultaneously selectable and wherein the different first row groups are individually and sequentially selectable, and wherein the read-out unit is configured to compute an average of the read-outs corresponding to the selected pixels that are in different selected rows.

By constructing first row groups using at least one imaginary row, a different center-to-center distance exists between the different row groups than that which is obtained in prior art devices. More in particular, the construction according to the present invention allows the center positions of the first row groups to lie on a regular grid thereby lowering the geometrical distortion of the resulting image.

The invention is related to the binning of rows of pixels. Normally, the definition of what constitutes a row of pixels and what constitutes a column of pixels depends on the driving circuitry used. Typically, a shift register is associated with addressing a row of pixels. However, the general concept of the present invention can be equally applied to the binning of pixels that are not addressed using a shift register. Hence, although preferable, the wording "rows of pixels" should not be interpreted as excluding the application of the invention to those pixels that would normally be referred to as "columns of pixels". For instance, sensor tiles could be butted horizontally compared to the vertical butting depicted in FIG. 5A.

The rows on each tile may be grouped in second row groups comprising adjacently arranged rows excluding the at least one imaginary row. In this case, the image sensor may further be separately operable in a normal binning mode, wherein each row in a second row group is simultaneously selectable, wherein the different second row groups are individually and sequentially selectable, and wherein the read-out unit is configured to compute an average of the read-outs corresponding to the selected pixels that are in different selected rows.

In an embodiment, each sensor tile may comprise an even amount of rows. Additionally or alternatively, the pixels on both tiles may have an identical height in the column direction, and the butting gap may be substantially equal to one or an odd multiple of this height.

Only one of the sensor tiles may comprise at least one and preferably one imaginary row. Additionally or alternatively, the second row groups may each comprise one even row and one odd row of pixels.

Each sensor tile may comprise a multiplexer unit comprising a respective multiplexer for each second row group, and a shift register comprising a plurality of flip flops respectively arranged for outputting a selecting signal to each respective second row group. Each multiplexer may be configured to, in the full-resolution mode or in the normal binning mode, forward the output of the flip flop in the same second row group to the row driver of one of the odd and even rows in that second row group, the output of the flip flop in that second row group being coupled to the other of the odd and even rows, and wherein the multiplexer is configured to, in the shifted binning mode, forward the output of the shift register corresponding to a previous or next second row group to the one of the odd and even rows.

The first or last pair of rows may be connected differently. For instance, instead of the multiplexer being coupled to a flip flop of a previous or second group it may be connected to a pulse source that outputs a single pulse that propagates through the shift register to sequentially select the rows.

The image sensor may further comprise a timing generator for generating a select odd timing signal for selecting a pixel in an odd row and a select even timing signal for selecting a pixel in an even row, wherein the timing generator is configured to generate the select odd timing signal and the select even timing signal to simultaneously select an odd and even row in the normal and shifted binning modes and to generate the select odd timing signal and the select even timing signal to sequentially select an odd and even row in the full-resolution mode.

The read-out unit may comprise a plurality of read-out circuits, each read-out circuit comprising one input connected to a column of pixels in an odd row and one input connected to a column of pixels in an even row, wherein the read-out circuit is configured to average read-outs that are simultaneously received.

According to a further aspect, the present invention provides a method for operating an image sensor, wherein the sensor comprises a pair of butted sensor tiles, each sensor tile comprising a pixel array comprising a plurality of rows and columns of photosensitive pixels, the sensor further comprising at least one imaginary row of photosensitive pixels added below the lowest row of pixels or above the highest row of pixels in at least one of the sensor tiles, wherein the rows and the at least one imaginary row on each tile are grouped in first row groups comprising adjacently arranged rows including said at least one imaginary row, wherein a center-to-center distance between adjacent first row groups is equal to a first distance on both sensor tiles, and wherein a center-to-center distance between first row groups that are on different tiles is substantially equal to one or a multiple of the first distance, the method comprising generating timing signals, respectively driving the respective rows in dependence of the timing signals, reading out selected pixels among said plurality of pixels, simultaneously selecting each row in a first row group and computing an average of the read-outs corresponding to the selected pixels that are in different selected rows, and sequentially selecting the first row groups.

Next, the present invention will be described in more detail referring to the appended drawings, wherein.

Figure 1:
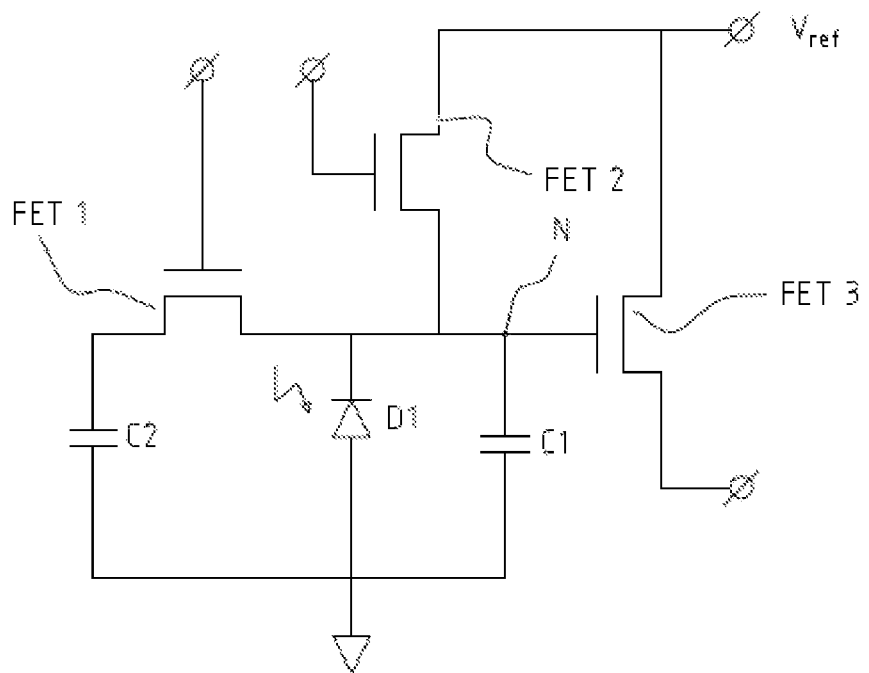
FIG. 1 illustrates a known pixel for a X-ray sensor.
Figure 2:
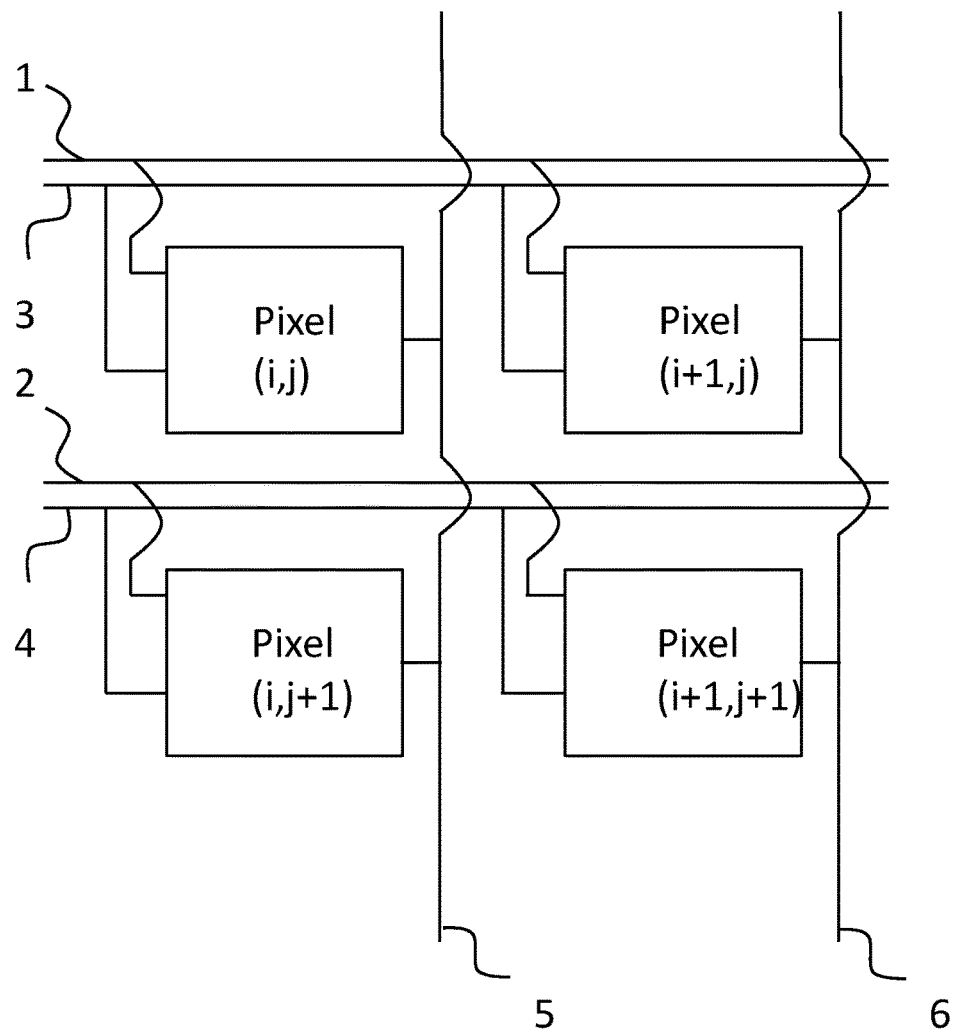
FIG. 2 illustrates a known pixel array.
Figure 3:
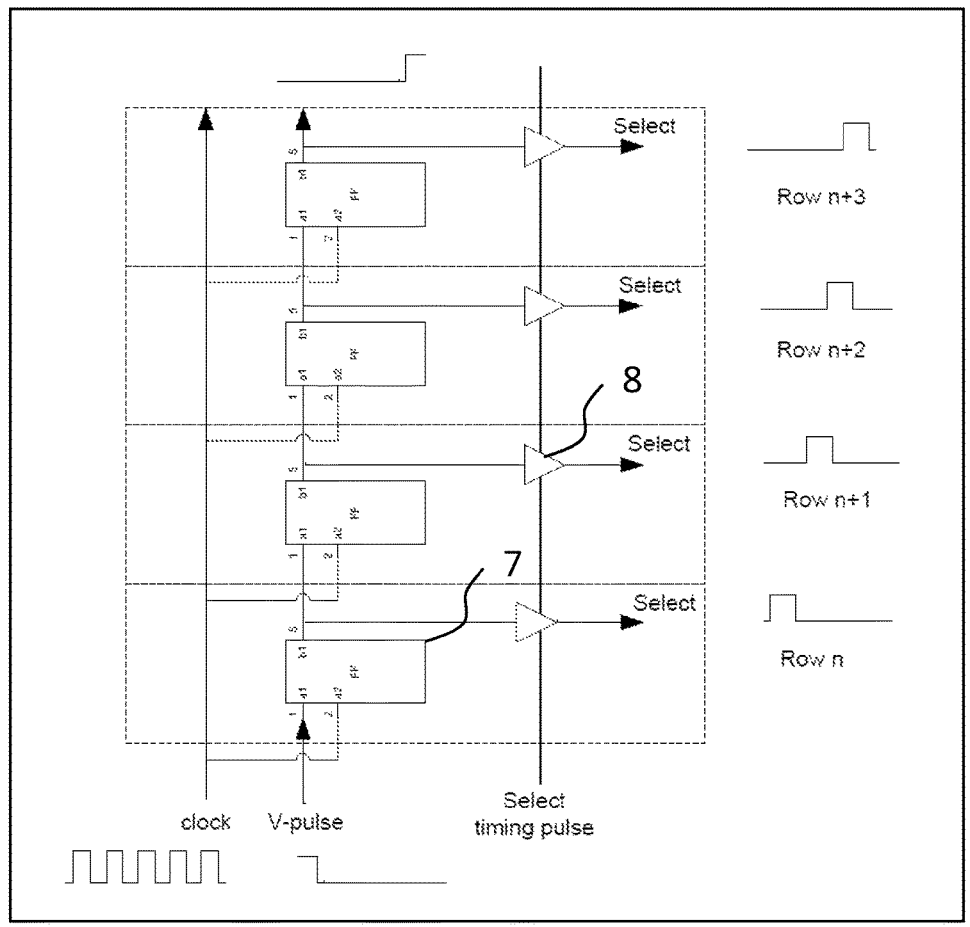
FIG. 3 illustrates a known shift register and known row drivers.
Figure 4:
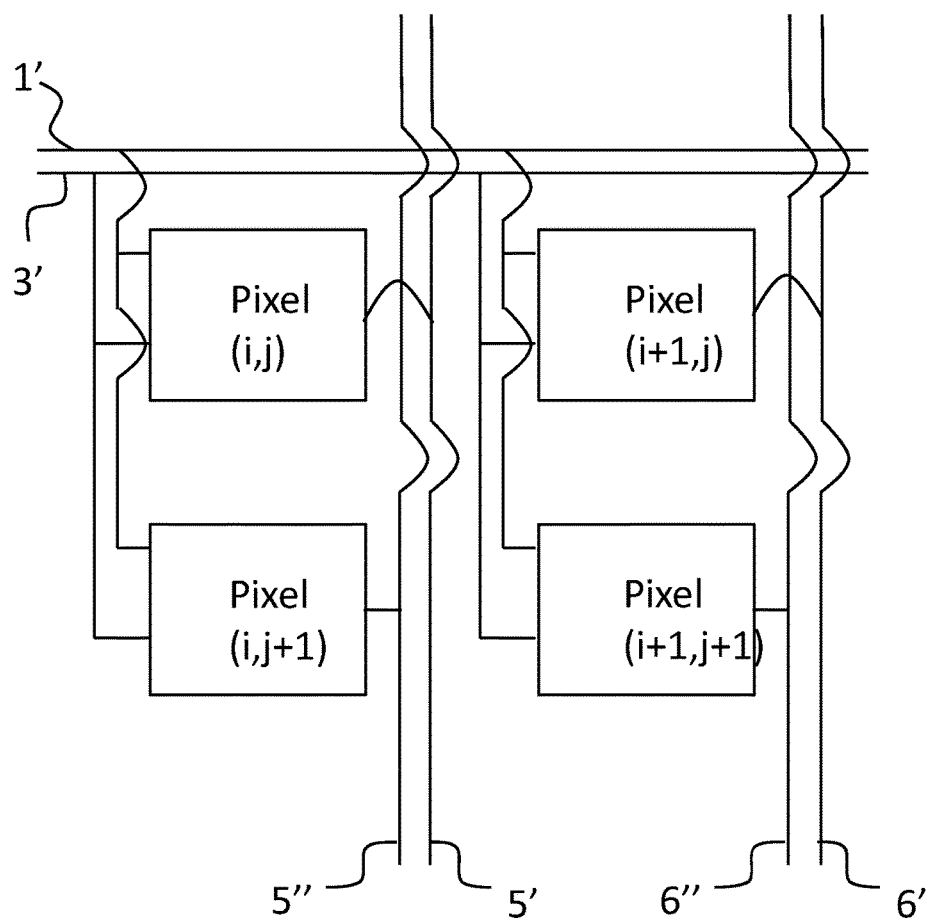
FIG. 4 illustrates a known pixel array used for binning.
Figure 5A:
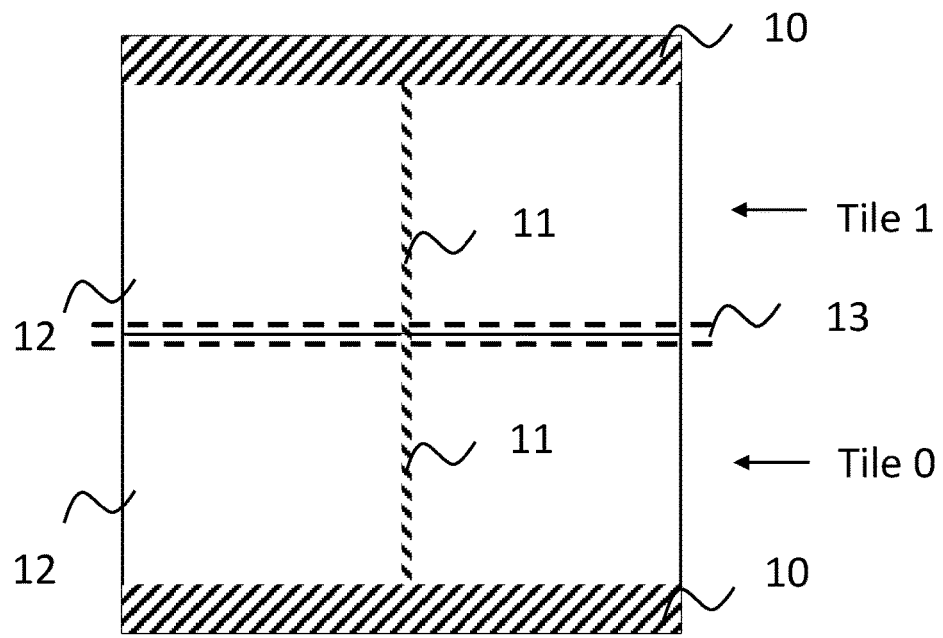
FIGS. 5A and 5B illustrate butted sensor tiles.
Figure 5B:
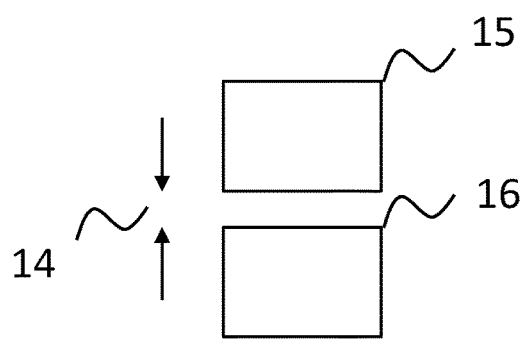
Figures 6A, 6B:
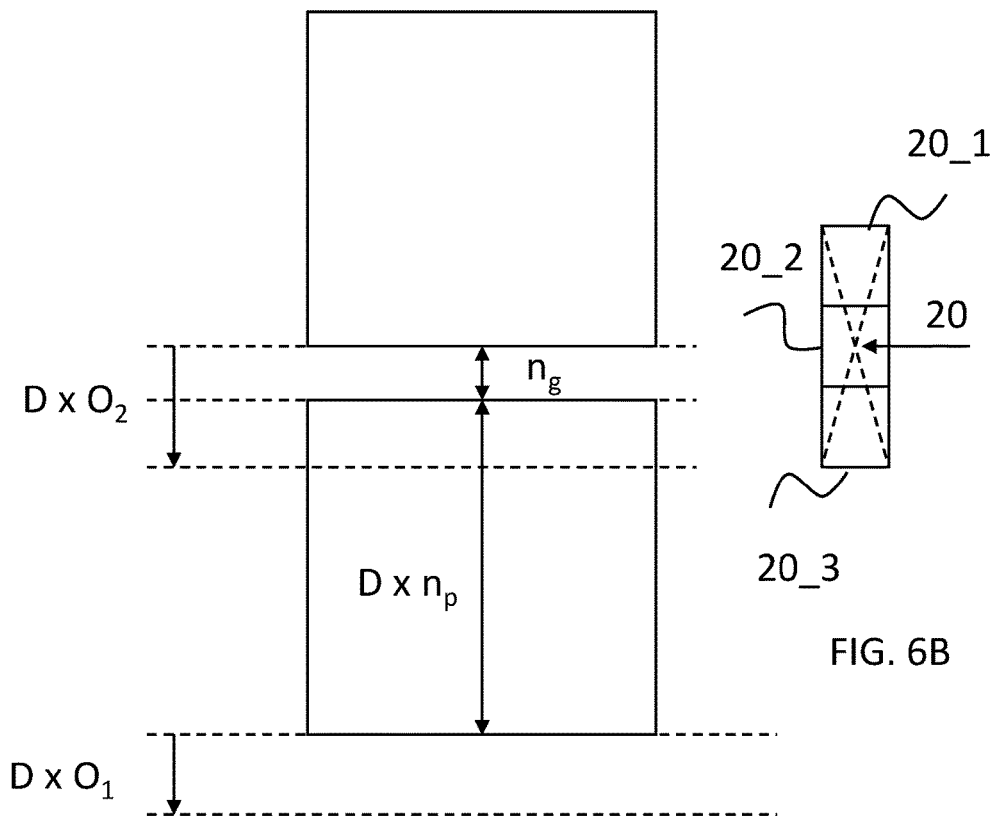
FIG. 6 illustrates a general concept of the present invention.

FIGS. 6A and 6B illustrate the general concept of the present invention. Here, two identical tiles, each having $n_p$ pixels of pixel height D are butted against each other in a mirrored manner, similar to the tiles illustrated in FIG. 5A. The amount of binning is represented by b, being the number of binned rows. According to the invention, an offset may be used when addressing the group of rows in a given bin. More in particular, instead of addressing the first b rows of the bottom tile, one or more imaginary rows are added below the lowest row of the bottom tile. The number of imaginary rows is referred to as $O_1$. Similarly, instead of addressing the first b rows of the upper tile, one or more imaginary rows are added below the lowest row of the upper tile. This number of imaginary rows is indicated as $O_2$. It should be apparent to the skilled person that rows may also be added above the highest rows in a tile. Moreover, tiles may be read-out reading rows top to bottom or vice versa.

When a number of rows of pixels are binned, a pixel value is calculated for each vertical group of binned pixels. An apparent position can be attributed to this pixel value as indicated in FIG. 6B. Here, arrow 20 indicates the center position of the binned group of pixels 20_1-20_3. This center position is used in FIG. 6A in the following manner. When an offset $O_1$ is used for the lower tile, the center position of the first group of binned pixels will be lowered. This applies in a similar manner to the upper tile that may use an offset $O_2$. On the other hand, the center positions of each group of binned pixels should be on a regular grid of which the nodes are separated in the vertical direction by $n \times b \times D$, wherein n is an integer. The position of these center positions is determined by the following equation:

$$-D \cdot O_1 + \frac{1}{2} \cdot b \cdot D + n \cdot b \cdot D = (n_p + n_g) \cdot D - D \cdot O_2 + \frac{1}{2} \cdot b \cdot D$$

wherein $n_p$ is the total amount of pixels in the vertical direction in the lower tile, and wherein $n_g$ is the number of imaginary pixels that is occupied by the butting gap. The first two terms represent the center position of the first group of binned pixels of the lower tile, wherein the lower horizontal edge of the pixel array of the lower tile is used as reference. The second term represents an integer times the distance between center positions. The terms after the equal sign represent the center position of the first group of binned pixels of the upper tile with respect to the lower horizontal edge of the pixel array of the lower tile.

If the distribution of center positions of the binned pixels corresponds to the equation above, a regular grid is obtained and geometrical distortions can be avoided or minimized Here it is noted that $n_g$ may deviate from being an integer value. In such case, it may be rounded to the nearest integer in order to use the equation above. The same may be applied to the other parameters is required to allow for small tolerances.

As an example, the lower tile may comprise 1000 rows and 800 columns, wherein each pixel has a size of 100 micrometer in the vertical direction. A butting gap of 100 micrometer is used. Binning is applied to pairs of rows, i.e. b=2. Inserting these parameters in the equation above yields $-100 \times O_1 + 0.5 \times 2 \times 100 + n \times 2 \times 100 = (1000+1) \times 100 - 100 \times O_2 + 0.5 \times 2 \times 100_1$. This can be reduced to $100 \times (O_2 - O_1) + n \times 2 \times 100 = 100100$. By taking 500 pairs of actual rows in the lower tile, i.e. n=500, one finds that $100 \times (O_2 - O_1) = 100$. If no offset is used for the upper tile, i.e. $O_2 = 0$, it can be deduced that an offset of a single pixel must be used for the lower tile, i.e. $O_1 = 100$ micrometer.

From the equation above, it can be derived that no offset at all is required when the butting gap is set to b×D, i.e. $n_g = b$. However, the skilled person would normally try to minimize the butting gap as much as possible to avoid blind spots in the image. Hence, values of $n_g$ equal or close to 1 are more likely.

Figure 7:
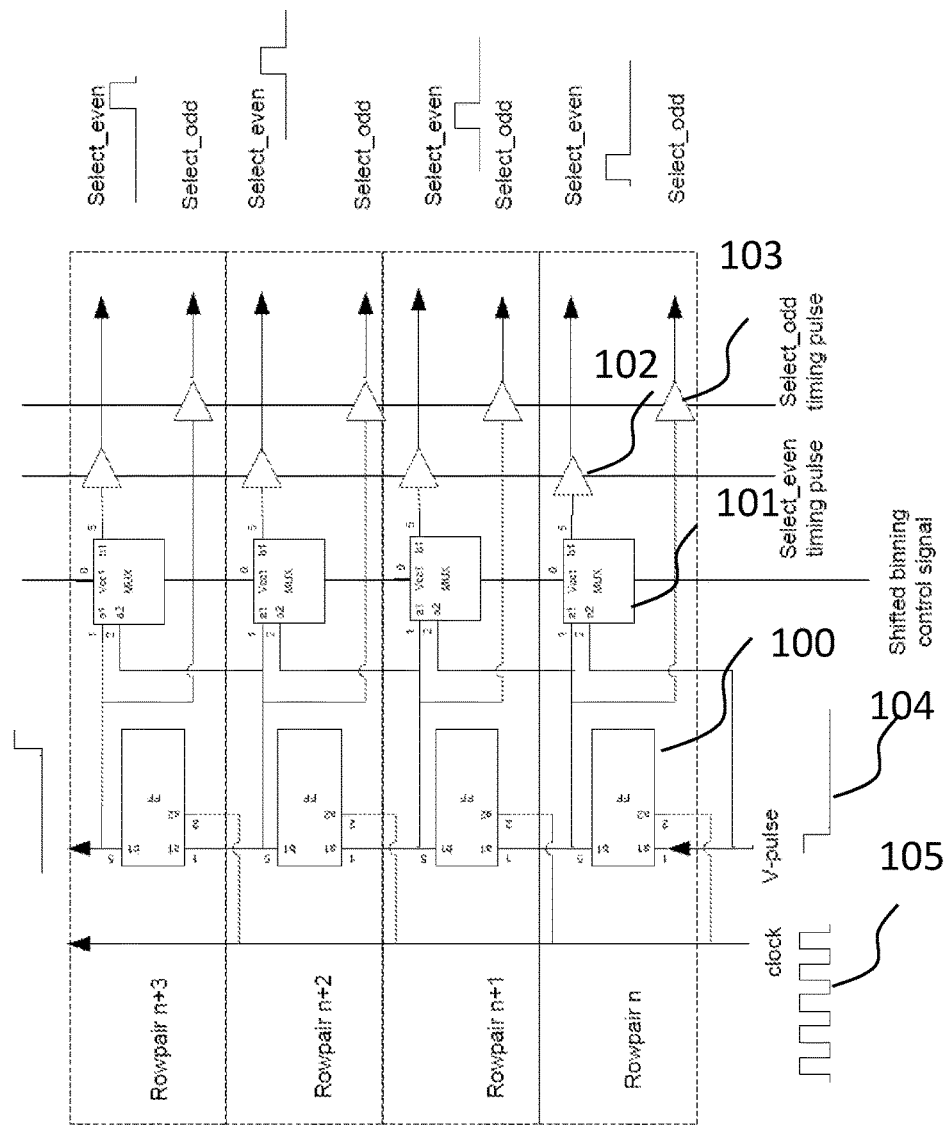
FIG. 7 illustrates part of an embodiment of a sensor tile in accordance with the present invention.

FIG. 7 presents an embodiment comprising a pixel array having even and odd rows of pixels. As described above, the outputs of the various pixels in the same column are coupled and each pixel can be individually selected using an appropriate select signal.

FIG. 7 also illustrates a shift register that comprises a plurality of flip flops 100, wherein each row pair is associated with a single flip flop 100. Moreover, the output (b1) of a flip flop 100 is normally coupled to an input (a1) of a next flip flop 100. A clock signal 105 is used for controlling the addressing of the row pairs.

Multiplexers 101 are used to determine the binning mode that is used in the system. Each multiplexer 101 is associated with a single row pair. One input (a1) of the multiplexer 101 is coupled to the output (b1) of the flip flop 100 of the corresponding row and to an input (a2) of a multiplexer 101 in a next row. The input (a2) of the first multiplexer 101 is fed with a single pulse signal 104. The output (b1) of a flip flop 100 in a given row pair is connected to the row driver 103 corresponding to the odd row in that row pair. The row driver 102 of the even row in a row pair is connected to the output (b1) of multiplexer 101 of that row.

Each multiplexer 101 is fed with the same binning control signal. This signal allows the sensor to operate in one of three modes: a) a full-resolution mode wherein no binning is used, b) a normal binning mode, and c) a shifted binning mode.

In the full-resolution mode, each multiplexer 101 forwards the input (a1) to its output (b1). During a single period of the clock signal fed to the flip flops 100, both the row driver 103 of the odd row and the row driver 102 of the even row are selected, albeit sequentially. This sequential operation is made possible by the select-even and select-odd pulses fed to the row drivers 102, 103, which in this mode are time-shifted with respect to each other. This allows signals from the odd and even row pixels to be read out separately.

The normal binning mode differs from the full-resolution mode in that the select-even and select-odd pulses are applied simultaneously. This allows an average to be computed.

In the shifted binning mode, each multiplexer 101 forwards the value at its input (a2) to its output (b1), wherein it is noted that the signal at this input (a2) originates from the output of flip flop 100 from a previous row pair. In the exemplary embodiment in FIG. 7, a row driver 102 in an even row n+1 is therefore selected simultaneously with a row driver 103 in an odd row n.

Figure 8:
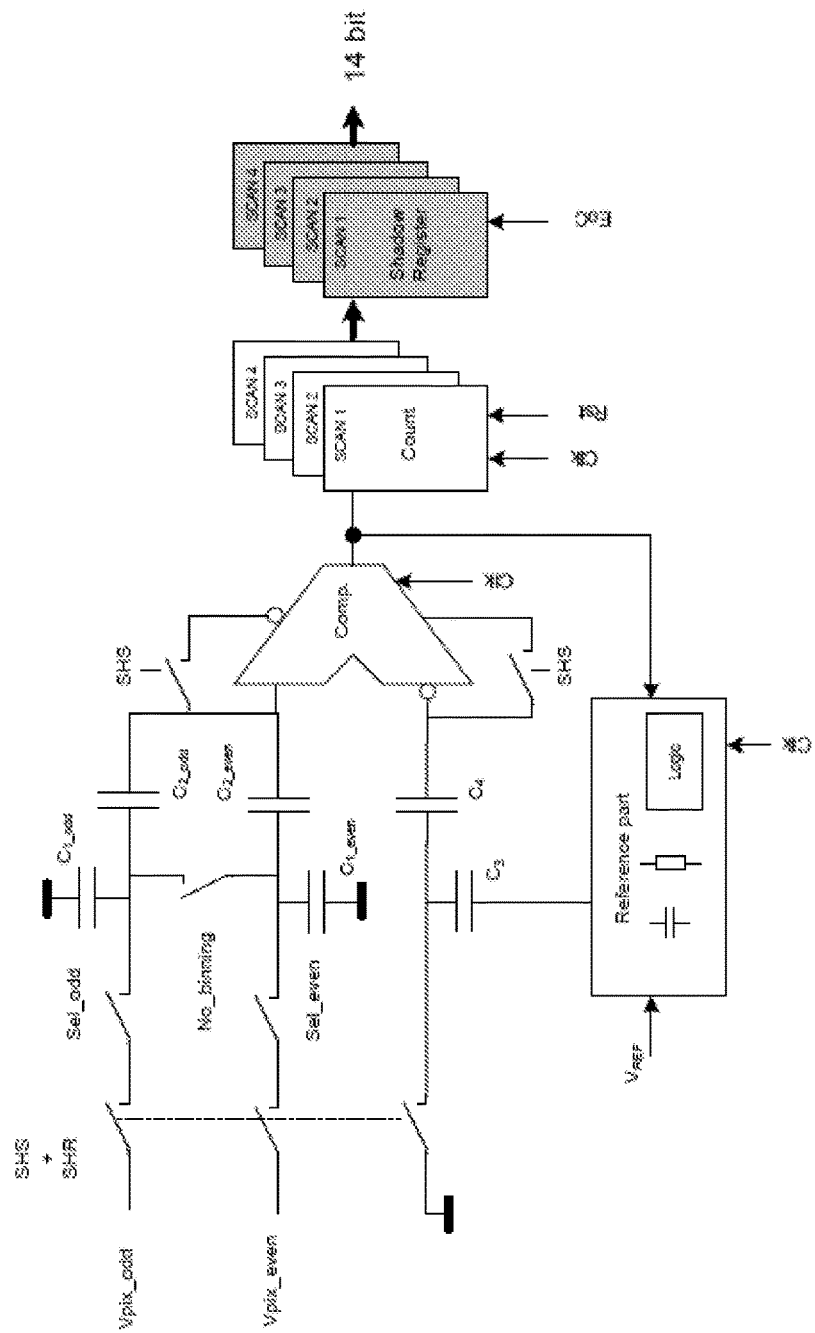
FIG. 8 illustrates a read-out circuit to be used on the sensor tile of FIG. 7.

FIG. 8 illustrates an exemplary embodiment of a read-out circuit that can be used for reading out the voltage at the various pixels in the pixel array. This read-out circuit is based on double delta sampling (DDS) wherein the pixel voltage is first sensed, then reset and then directly sensed again. This allows the influence of process spread to be reduced considerably. This order may be reversed.

The process of double delta sampling is regulated using two timing signals SHS and SHR, wherein the SHS signal is indicative for sampling a pixel voltage after it has been given a predetermined amount of time during which a photocurrent was generated, and wherein the SHR signal is indicative for sampling the pixel voltage of that same pixel directly after it has been reset.

The operational principles of the read-out circuitry will now be explained referring to FIG. 8. As a starting point, it is assumed that a binning mode has been selected. A binning mode control signal is sent to the no_binning switch as a result of which the no_binning switch is in the open state. Then, a SHS timing signal is provided to start the sampling process. Regardless of the binning mode, the select odd and select even timing signals (see FIG. 7) are synchronous. Therefore, a signal Vp_odd_sig, being the pixel voltage of the pixel in the odd row, is applied to capacitor C1_odd, which is connected to ground. Similarly, a signal Vp_even_sig is applied to capacitor C1_even.

During the application of the active SHS timing signal, the inverting output of the comparator is connected to its positive terminal $V^+$, and the non-inverted output to its negative inverted terminal $V^-$.

The output voltage Vout can in this case be computed using $Vout=A\times(V^+-V^--Voff)=A\times(-Vout-Vout-Voff)$ wherein A is the amplification factor and Voff the voltage offset. Reducing this equation and assuming that $A\gg 1$ yields that $Vout=-\frac{1}{2}Voff$. Also note that the voltage over C3 is equal to zero due to the grounded connection.

The voltage drop over capacitors C2_odd and C2_even can be expressed in a charge accumulated at the terminals of the capacitors closest to the comparator: $Q\_odd=C2\_odd\times(Vp\_odd\_sig-\frac{1}{2}Voff)$ and $Q\_even=C2\_even\times(Vp\_even\_sign-\frac{1}{2}Voff)$.

Next, the SHR timing signal is applied. In this case, the comparator operates in open loop. Consequently, the charges Q_odd and Q_even are trapped inside C2_odd and C2_even. Due to the application of the SHR timing signal, a new voltage is applied to C1_odd, i.e. Vp_odd_res and a new voltage is applied to C1_even, i.e. Vp_even_res. The voltage drop over C2_odd can again be expressed in a charge $Q\_odd\_res=C2\_odd\times(Vp\_odd\_res-V^+)$. Similarly, The voltage drop over C2_even can be expressed in a charge $Q\_even\_res=C2\_even\times(Vp\_even\_res-V^+)$. The sum of these charges has not changed. Taking $C2\_even=C2\_odd=C2$ gives $C2\times(Vp\_odd\_res-V^+)+C2\times(Vp\_even\_res-V^+)=C2\times(Vp\_odd\_sig-\frac{1}{2}Voff+Vp\_even\_sign-\frac{1}{2}Voff)$. This can be reduced to $V^+=(V\_p\_odd\_res+V\_p\_even\_res)/2-(Vp\_odd\_sig+Vp\_even\_sig)/2+\frac{1}{2}Voff$. Due to the fact that V has not changed from its previous value due to the open loop configuration, Vout can be computed using $Vout=A\times(V^+-V^--Voff)=A\times((Vp\_odd\_res+Vp\_even\_res)/2-(Vp\_odd\_sig+Vp\_even\_sig)/2)$. Hence, the output voltage is determined by the difference between the average pixel voltage directly after reset and the average pixel voltage due to the influence of the photocurrent. Accordingly, the read-out circuit averages the inputs of the pixels of the odd and even rows as intended.

When a binning mode control signal is sent to the no_binning switch to close the switch to allow a full-resolution mode, C1_odd and C1_even are placed parallel. Moreover, unlike in the binning mode, an identical voltage is now applied over these capacitors. The result from above for the binning mode can be used to demonstrate that in the full-resolution mode $Vout=A\times(Vp\_odd\_res-Vp\_odd\_sig)$ or $Vout=A\times(Vp\_even\_res-Vp\_even\_sig)$, corresponding to the situation wherein a pixel in an odd or even row has been selected, respectively.

The remaining circuitry in FIG. 8 is used to find a digital word to represent the analog signal outputted by the comparator. This is achieved by varying the voltage at the inverting terminal of the comparator. The variation is normally performed using different voltage steps. For instance, in a first scan a rough estimate can be found, whereas in later scans a smaller voltage step is used to find a more accurate estimate. The process of using different voltage steps is known to the skilled person therefore a more elaborate discussion is omitted.

Figure 9:
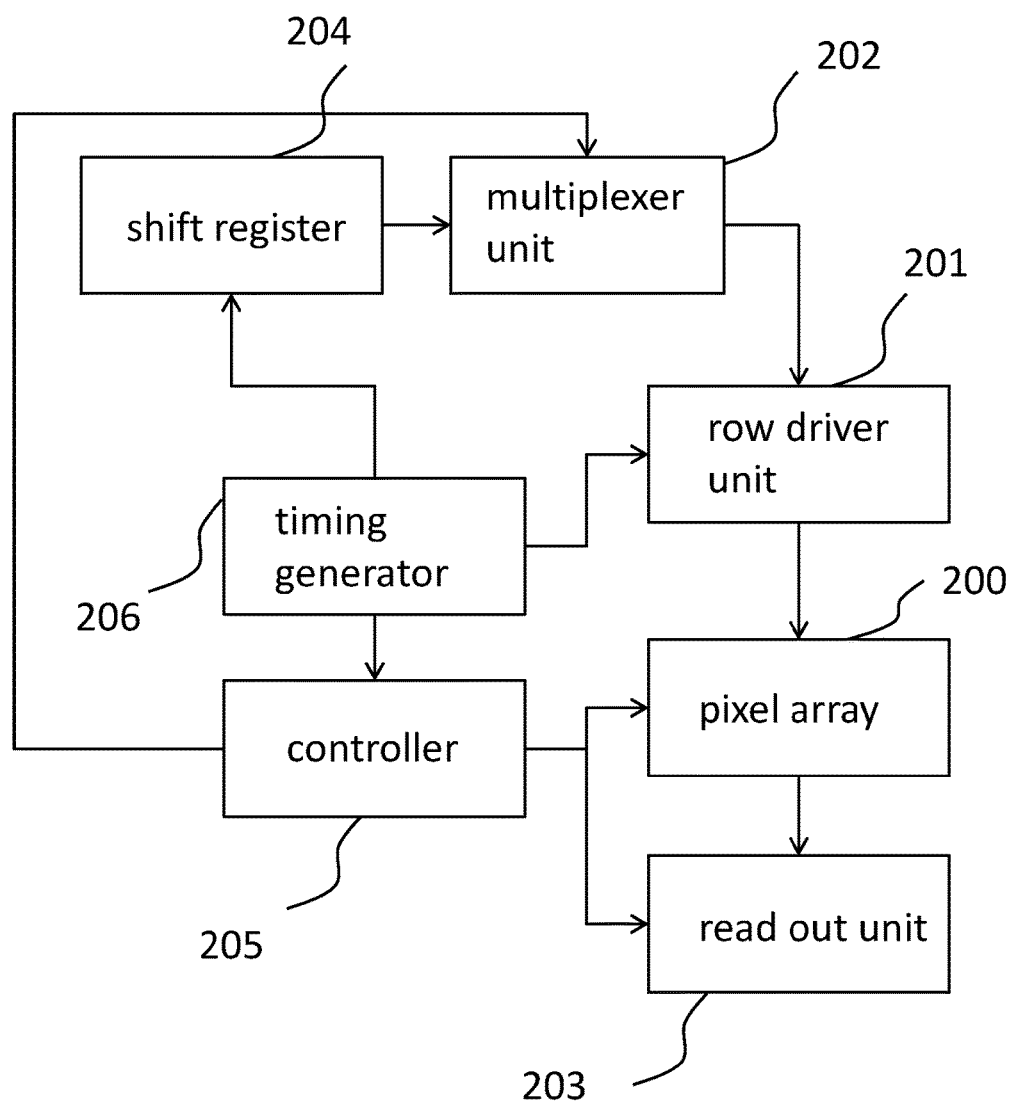
FIG. 9 illustrates an embodiment of an image sensor according to the present invention.

FIG. 9 illustrates an embodiment of an image sensor according to the invention. It comprises a pixel array 200 and a row driver unit 201 comprising a plurality of row drivers for driving the rows of pixels in pixel array 200. It further comprises a multiplexer unit 202 that comprises a respective multiplexer for each second row group and a shift register 204 comprising a plurality of flip flops respectively arranged for outputting a selecting signal to each respective second row group.

The image sensor also comprises a read-out unit 203 for reading out selected pixels among the plurality of pixels of the pixel array. In addition, the image sensor may comprise a timing generator 206 for generating the timing signals required for the row drivers, for generating a clock signal, and for generating a pulse signal that is fed into the shift register. A controller 205 is used for providing the binning control signal to read-out unit 203 and to multiplexer unit 202. It further controls the timing generator.

Although the invention has been described with reference to exemplary embodiments, it should be apparent to the skilled person that the invention is not limited to these embodiments, but that variations or modifications are possible without deviating from the scope of the invention, which is defined by the appended claims.

For instance, an X-ray sensor may comprise pixels that require a select signal for selecting the pixel and a reset signal for resetting the pixels. Furthermore, dedicated read-out techniques may be employed to improve the signal-to-noise ratio, such as correlated double sampling. Although the embodiments discussed only refer to the selection process of the pixels, in other words to the select signal, the skilled person readily understands that these principles and methods can be applied to the reset signal, for instance by essentially duplicating the shift register and multiplexer topology of FIG. 7.

The invention claimed is:

1. An image sensor, comprising:
    a pair of butted sensor tiles, each sensor tile comprising:
        a pixel array comprising a plurality of rows and columns of photosensitive pixels;
        a respective row driver for driving the respective rows in dependence of a respective timing signal;
        a read-out unit for reading out selected pixels among said plurality of pixels;
        a timing controller for generating the timing signals;
        at least one imaginary row of photosensitive pixels added below the lowest row of pixels or above the highest row of pixels in at least one of the sensor tiles;
    wherein the rows and the at least one imaginary row on each tile are grouped in first row groups comprising adjacently arranged rows including said at least one imaginary row, wherein a center-to-center distance between adjacent first row groups is equal to a first distance on both sensor tiles, and wherein a center-to-center distance between first row groups that are on different tiles is substantially equal to one or a multiple of said first distance;
    wherein the image sensor is separately operable in each of the following modes:
        a full-resolution mode wherein each row of pixels is individually selectable and wherein the read-out unit is configured to read-out the pixels in the selected row; and
        a shifted binning mode, wherein each row in a first row group is simultaneously selectable and wherein the different first row groups are individually and sequentially selectable, and wherein the read-out unit is configured to compute an average of the read-outs corresponding to the selected pixels that are in different selected rows.

2. The image sensor according to claim 1, wherein the rows on each tile are grouped in second row groups comprising adjacently arranged rows excluding said at least one imaginary row, said image sensor further being separately operable in a normal binning mode, wherein each row in a second row group is simultaneously selectable, wherein the different second row groups are individually and sequentially selectable, and wherein the read-out unit is configured to compute an average of the read-outs corresponding to the selected pixels that are in different selected rows.

3. The image sensor according to claim 2, wherein each sensor tile comprises an even amount of rows.

4. The image sensor according to claim 3, wherein the pixels on both tiles have an identical height in the column direction, and wherein the butting gap is substantially equal to one or an odd multiple of this height.

5. The image sensor according to claim 4, wherein only one of said sensor tiles comprises at least one imaginary row, and wherein the second row groups each comprise one even row and one odd row of pixels.

6. The image sensor according to claim 5, wherein each sensor tile comprises:
    a multiplexer unit comprising a respective multiplexer for each second row group;
    a shift register comprising a plurality of flip flops respectively arranged for outputting a selecting signal to each respective second row group;
    wherein each multiplexer is configured to, in the full-resolution mode or in the normal binning mode, forward the output of the shift register in the same second row group to the row driver of one of the odd and even rows in that second row group, the output of the shift register in that second row group being coupled to the other of said odd and even rows, and wherein the multiplexer is configured to, in the shifted binning mode, forward the output of the shift register corresponding to a previous or next second row group to said one of the odd and even rows.

7. The image sensor according to claim 6, further comprising a timing generator for generating a select odd timing signal for selecting a pixel in an odd row and a select even timing signal for selecting a pixel in an even row, wherein the timing generator is configured to generate the select odd timing signal and the select even timing signal to simultaneously select an odd and even row in the normal and shifted binning modes and to generate the select odd timing signal and the select even timing signal to sequentially select an odd and even row in the full-resolution mode.

8. The image sensor according to claim 6 or 7, wherein the read-out unit comprises a plurality of read-out circuits, each read-out circuit comprising one input connected to a column of pixels in an odd row and one input connected to a column of pixels in an even row, wherein the read-out circuit is configured to average read-outs that are simultaneously received.

9. The image sensor according to claim 7, wherein the read-out unit comprises a plurality of read-out circuits, each read-out circuit comprising one input connected to a column of pixels in an odd row and one input connected to a column of pixels in an even row, wherein the read-out circuit is configured to average read-outs that are simultaneously received.

10. A method for operating an image sensor, said sensor comprising a pair of butted sensor tiles, each sensor tile comprising a pixel array comprising a plurality of rows and columns of photosensitive pixels, the sensor further comprising at least one imaginary row of photosensitive pixels added below the lowest row of pixels or above the highest row of pixels in at least one of the sensor tiles, wherein the rows and the at least one imaginary row on each tile are grouped in first row groups comprising adjacently arranged rows including said at least one imaginary row, wherein a center-to-center distance between adjacent first row groups is equal to a first distance on both sensor tiles, and wherein a center-to-center distance between first row groups that are on different tiles is substantially equal to one or a multiple of said first distance, the method comprising:
- generating timing signals;
- respectively driving the respective rows in dependence of the timing signals;
- reading out selected pixels among said plurality of pixels;
- simultaneously selecting each row in a first row group and computing an average of the read-outs corresponding to the selected pixels that are in different selected row; and
- sequentially selecting the first row groups.

* * * * *